Dec. 16, 1924.
A. D. HERSCHLER
NUT LOCK
Filed Dec. 14, 1923
1,519,836
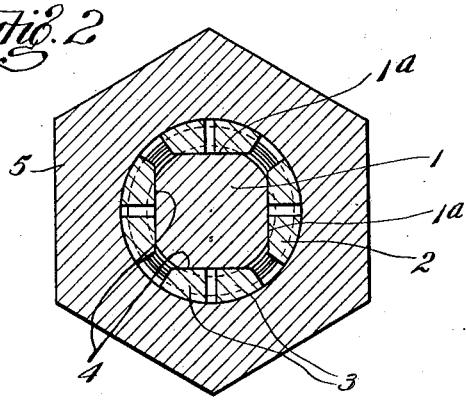
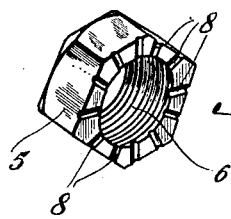
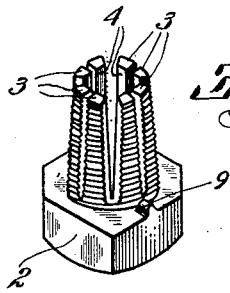
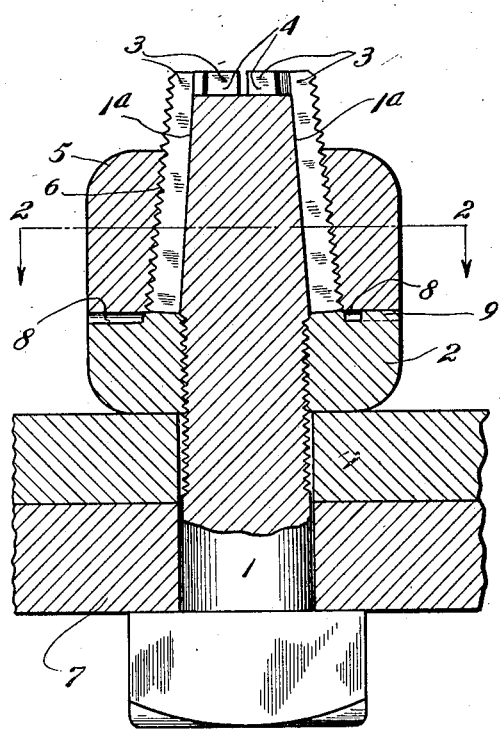
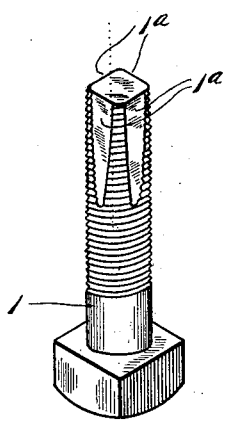
Inventor
A. D. Herschler
By Fraser and Bond
Attorneys Patented Dec. 16, 1924.

1,519,836

UNITED STATES PATENT OFFICE.

ALBERT D. HERSCHLER, OF CANTON, OHIO.

NUT LOCK.

Application filed December 14, 1923. Serial No. 680,587.

*To all whom it may concern:*

Be it known that I, ALBERT D. HERSCHLER, a citizen of the United States, residing at Canton, in the county of Stark and State of Ohio, have invented certain new and useful Improvements in Nut Locks, of which the following is a specification.

This invention relates to nut locks and the objects of the improvement are to provide a simple, durable and efficient nut lock comprising two separable parts, arranged to be locked together in the operative position to securely hold the nut upon a bolt and capable of effectually withstanding jars and strains.

The above and other objects may be attained by constructing the nut in the manner illustrated in the accompanying drawing, in which—

Figure 1 is a longitudinal sectional view through a bolt, provided with the improved nut lock, showing the same in locked position thereon;

Fig. 2, a section on the line 2—2, Fig. 1;

Fig. 3, a perspective view of the bolt adapted to be used in connection with this nut lock;

Fig. 4, a perspective view of the nut provided with the locking fingers; and

Fig. 5, a detached perspective view of the locking nut.

Similar numerals refer to similar parts throughout the drawing.

The bolt 1, provided for use with the improved nut lock, is provided with a plurality of inclined, flat faces 1ª, upon its end portion, which may be formed by cutting away the threaded surface of the bolt at intervals. These flattened portions of the bolt are preferably inclined toward the outer end thereof, as best illustrated in Fig. 1.

The nut 2 is provide with a conical sleeve which is split longitudinally, forming the fingers 3, the outer surfaces of which are threaded, forming a continuous conical thread, tapered from the body of the nut toward the outer end of the fingers. The inner surface of the fingers are flat as indicated at 4, and so arranged that in the form illustrated, the inner flat faces of each two fingers will engage the adjacent flattened surface of the bolt. The locking nut 5 is provided with a conical, internally threaded portion 6 arranged to engage the threaded fingers 3.

In assembling the device, the bolt 1 is first passed through the work indicated at 7, and the nut 2 is then placed upon the outer end of the bolt and screwed down into the desired adjustment. The locking nut 5 is then placed upon the external threads of the fingers 3 and screwed down into position as shown in Fig. 1, clamping the flat inner faces of these fingers tightly upon the flattened faces 1ª of the bolt.

It should be noted that for the purpose of holding the locking nut 5 in locking position upon the fingers of the nut 2, a plurality of radial grooves or depressions 8 are formed in the under surface of the nut 5, and arranged to be engaged by the lug or rib 9 upon the upper surface of the nut 2.

These grooves or depressions are so arranged that as the nut 5 is tightened, one groove or depression will engage the lug 9, holding the locking nut against movement with reference to the nut 2, the fingers of which are clamped tightly upon the flat faces 1ª of the bolt, preventing turning movement of the nut 2 thereon.

From the above, it will be obvious that a simple, durable and efficient locking means is provided for positively locking the nut upon the bolt and holding the same in locked position to effectually withstand strains and jars to which the bolt may be subjected.

I claim:—

1. In combination with a bolt having flattened faces, a nut provided with a plurality of outwardly projecting locking fingers having flat inner faces for engagement with the flat faces of the bolt and a locking member embracing the locking fingers and forcing them inward into contact with the flat faces of the bolt.

2. In combination with a bolt having flattened faces, a nut provided with a plurality of outwardly projecting locking fingers having flat inner faces for engagement with the flat faces of the bolt and a locking member embracing the locking fingers and forcing them inward into contact with the flat faces of the bolt, and means for positively holding the locking member against movement with relation to the fingers.

3. In combination with a bolt having flattened faces, a nut provided with a plurality of outwardly projecting, externally threaded locking fingers having flat inner faces for engagement with the flat faces of the bolt and a locking nut embracing the locking fingers and forcing them inward into contact with the flat faces of the bolt.

4. In combination with a bolt having flattened faces, a nut provided with a plurality of outwardly projecting, externally threaded locking fingers having flat inner faces for engagement with the flat faces of the bolt and a locking nut embracing the locking fingers and forcing them inward into contact with the flat faces of the bolt, and means for positively holding the locking nut against movement with relation to the fingers.

5. In combination with a bolt having flattened faces, a nut provided with a plurality of outwardly projecting locking fingers having flat inner faces for engagement with the flat faces of the bolt and a locking member embracing the locking fingers and forcing them inward into contact with the flat faces of the bolt, the locking member being provided with a plurality of recesses and a lug upon the nut for engagement with one of said recesses.

6. In combination with a bolt having flattened faces, a nut provided with a plurality of outwardly projecting, externally threaded locking fingers having flat inner faces for engagement with the flat faces of the bolt, a locking nut embracing the locking fingers and forcing them inward into contact with the flat faces of the bolt, the locking nut being provided with a plurality of radial grooves, and a lug upon the other nut for engagement with one of the grooves.

In testimony that I claim the above, I have hereunto subscribed my name.

ALBERT D. HERSCHLER.